(12) United States Patent
Spiegel

(10) Patent No.: US 9,936,675 B2
(45) Date of Patent: Apr. 10, 2018

(54) METHOD OF PROMOTING EFFICIENT WATER DRINKING BY ANIMALS

(71) Applicant: H. Jay Spiegel, Mount Vernon, VA (US)

(72) Inventor: H. Jay Spiegel, Mount Vernon, VA (US)

(*) Notice: Subject to any disclaimer, the term of this patent is extended or adjusted under 35 U.S.C. 154(b) by 858 days.

(21) Appl. No.: 13/750,116

(22) Filed: May 14, 2013

(65) Prior Publication Data

US 2013/0276713 A1 Oct. 24, 2013

Related U.S. Application Data

(62) Division of application No. 12/801,297, filed on Jun. 2, 2010, now Pat. No. 8,381,686, which is a division of application No. 11/715,947, filed on Mar. 9, 2007, now abandoned.

(51) Int. Cl.
*A01K 7/00* (2006.01)

(52) U.S. Cl.
CPC ....................... *A01K 7/00* (2013.01)

(58) Field of Classification Search
USPC ....... 119/51.01, 51.5, 52.1, 52.4, 58, 59, 60, 119/61.1, 63, 61.5, 72, 74
See application file for complete search history.

(56) References Cited

U.S. PATENT DOCUMENTS

| | | | |
|---|---|---|---|
| 679,285 A * | 7/1901 | Allen | 119/51.5 |
| 1,251,374 A * | 12/1917 | Hosch | 119/63 |
| D251,688 S * | 4/1979 | Kimbrough, III | D30/124 |
| 4,357,905 A * | 11/1982 | Carpenter | 119/61.53 |
| D288,650 S * | 3/1987 | Mintz | D7/505 |
| D302,755 S * | 8/1989 | Zaliti | D30/130 |
| D335,940 S * | 5/1993 | McGrath et al. | D30/130 |
| D347,303 S * | 5/1994 | Mann | D30/130 |
| 5,323,733 A * | 6/1994 | Youngs-McVicker | 119/464 |

(Continued)

*Primary Examiner* — Trinh T Nguyen
(74) *Attorney, Agent, or Firm* — H. Jay Spiegel

(57) ABSTRACT

A method of promoting efficient water drinking by animals uses any one of a number of container embodiments. A first embodiment of container contemplates five sub-chambers separated from one another by parallel partitions, with each partition having a small weep hole near its bottom to equalize water level in each sub-chamber. Each sub-chamber has an elongated length dimension and a width that is relatively narrow and designed to approximate the width of an animal's tongue. When an animal is drinking water from one of the sub-chambers of this embodiment, as the tongue is lapping, the sides of the tongue are close to the inner walls of the sub-chamber, thereby precluding some of the water resting on the tongue from falling off the tongue as the water is lifted into the animal's mouth. In this way, the efficiency of drinking using the lapping technique is enhanced. In a further embodiment, a second sub-chamber provides a reservoir for replenishing the first sub-chamber as it drains down through a small weep hole near the bottom of a common wall between the sub-chambers. The second sub-chamber may be designed to receive an inverted bottle filled with water so that continuous replenishment of the drinking sub-chamber through a weep hole connecting the supply sub-chamber may be accomplished.

20 Claims, 4 Drawing Sheets

(56) References Cited

U.S. PATENT DOCUMENTS 6,119,628 A * 9/2000 Lorenzana et al. ............. 119/77
6,189,489 B1 * 2/2001 Pearce .......................... 119/477
6,971,331 B1 * 12/2005 Rohrer ............................ 119/77

* cited by examiner

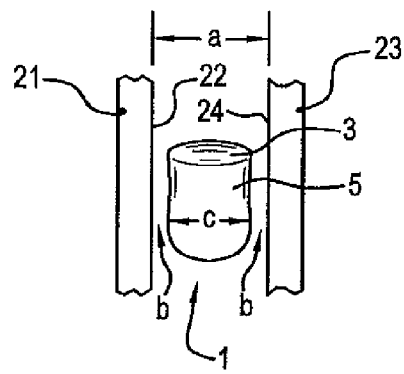
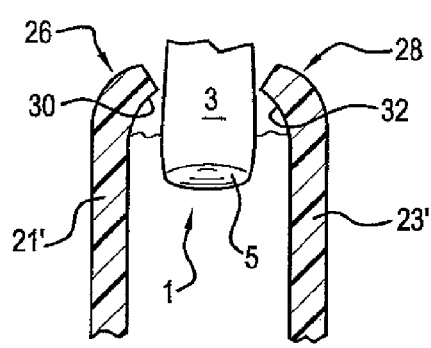
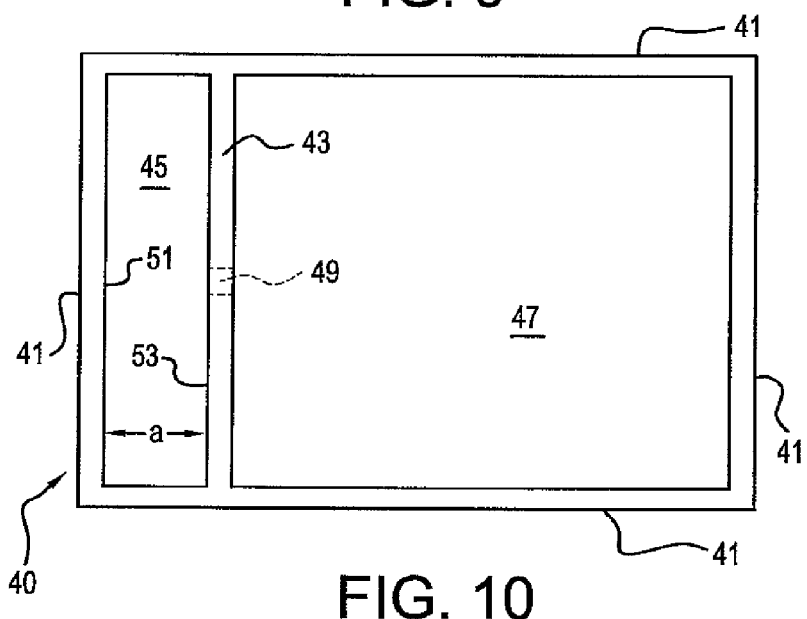
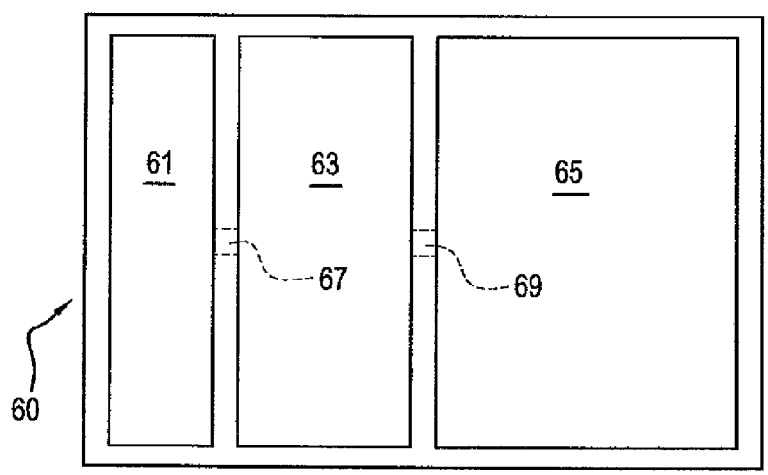

METHOD OF PROMOTING EFFICIENT WATER DRINKING BY ANIMALS

This application is a Divisional of application Ser. No. 11/715,947, filed Mar. 9, 2007.

BACKGROUND OF THE INVENTION

The present invention relates to a method of promoting efficient water drinking by animals. Animals use their tongues to drink water. They dip their tongue into a container of water with the end of the tongue curved backward and then lift the tongue upwardly bringing a quantity of water into their mouth. This is an extremely inefficient way to convey water into their mouth. In particular, the portion of the tongue that is bent backward is relatively flat allowing the water to spill off the sides of that portion of the tongue as the tongue is lifted up with a quantity of water resting thereon. In a book titled "Canine Behavior," Dr. Bonnie Beaver, President of the American Veterinary Medical Association, says the following:

> "The tongue is curled backward and serves as a ladle to lift the water into the mouth. Because the curl is almost flat across instead of cup-shaped, much of the water spills out from the sides before the dog can get it into the mouth. About half is lost."

As explained by Stan Coren, Professor of Psychology at the University of British Columbia and author of the book "How Dogs Think":

> "A dog's tongue curls down and back in a sort of fishhook shape and he literally pulls the water up and it falls into the floor of his mouth. How quickly a dog can drink depends upon the size of its tongue."

Larger animals have larger tongues and are able to lift a greater quantity of water per lap. Typically, the larger the animal, the wider the tongue. Given tongues of equal lengths, a wider tongue can lift a larger quantity of water per lap.

Drinking bowls and containers for animals that are currently made are mainly large containers filled with water without any thought to designing their shape in a way to enhance the efficiency of drinking. The animal, such as a dog, cat, other pet or other animal, merely laps the water from the bowl or container and keeps lapping until it has received its fill. If the configuration of a container of water were designed to enhance efficiency of drinking, such a container would be pleasing to an animal.

U.S. Pat. No. D302,755 to Zaliti and U.S. Pat. No. D335,940 to McGrath et al. teach pet feeding dishes having container portions that are elongated and relatively narrow. However, these patents do not contemplate the problem of the inefficiency of lapping of water nor do they propose a solution.

U.S. Pat. No. D288,650 to Mint; similarly, teaches a plurality of compartments of general utility, but fails to contemplate either the problem or the solution contemplated herein.

U.S. Pat. No. 5,323,733 to Youngs-McVicker teaches a bird feeder having a partition therein for reducing feed scattered by birds. In the Youngs-McVicker device, the partition includes two extremely large openings interconnecting adjacent chambers 38 and 40. The actual chambers are not extremely narrow nor does Youngs-McVicker teach or contemplate any solution to the problem of the inefficiency of lapping by an animal to drink water.

SUMMARY OF THE INVENTION

The present invention relates to a method of promoting efficient water drinking by animals, based on a container disclosed in several embodiments. The present invention includes the following interrelated objects, aspects and features:

(1) In a first aspect in practicing the method, any one of a number of embodiments of container is provided. A first embodiment of container contemplates a generally rectangular cubic container including five sub-chambers generally separated from one another by parallel partitions, with each partition having a small weep hole near its bottom. The weep holes are designed to facilitate equalization of water level in each sub-chamber. Each sub-chamber has an elongated length dimension and a width that is relatively narrow and designed to approximate the width of an animal's tongue. When an animal is drinking water from one of the sub-chambers of this embodiment, as the tongue is lapping, the sides of the tongue are close to the inner walls of the sub-chamber, thereby precluding some of the water resting on the tongue from falling off the tongue as the water is lifted into the animal's mouth. In this way, the efficiency of drinking using the lapping technique is enhanced.

(2) The container may be made with sub-chambers having differing widths to accommodate to animals of different sizes and different tongue widths. In one embodiment, a single container can include sub-chambers having a variety of respective widths so that animals of different sizes can use the same container drinking from differing sub-chambers.

(3) In a further embodiment, if desired, the upper terminations of the walls of each sub-chamber can curve toward one another to enhance retention of water on the tongue of an animal drinking therefrom.

(4) In a further embodiment, the inventive container can include a first narrow elongated sub-chamber from which the animal may drink and a second sub-chamber of the same or different size configuration and/or volume, and which is merely there to comprise a reservoir replenishing the first sub-chamber as it drains down through a small weep hole near the bottom of a common wall between the sub-chambers.

(5) In a further embodiment, the inventive container may comprise a single narrow elongated sub-chamber connected via a weep hole with a second sub-chamber designed to receive an inverted bottle filled with water so that continuous replenishment of the drinking sub-chamber through a weep hole connecting the supply sub-chamber may be accomplished. Products using this inverted bottle technique are well known generally, for example, one sold under the trademark LE BISTRO® owned by the Microban Products Company.

Accordingly, it is a first object of the present invention to provide a method of promoting efficient water drinking by animals.

It is a further object of the present invention to provide such a method employing a device in which the side walls of a drinking sub-chamber are made close enough together so that they approximate the width of an animal's tongue to enhance drinking efficiency.

It is a still further object of the present invention to provide such a method in which sub-chambers of differing widths are provided in a container for different animals.

It is a still further object of the present invention to provide such a method in which a plurality of sub-chambers of equal widths are provided.

It is a yet further object of the present invention to provide such a method in which a drinking sub-chamber is provided along with a supply sub-chamber to replenish water to the drinking sub-chamber via a small weep hole.

It is a still further object of the present invention to provide such a method in which a supply reservoir comprises an inverted bottle filled with water.

These and other objects, aspects and features of the present invention will be better understood from the following detailed description of the preferred embodiments when read in conjunction with the appended drawing figures.

BRIEF DESCRIPTION OF THE DRAWINGS

FIG. 7 shows a schematic representation of two adjacent sub-chamber walls and an animal's tongue therebetween.

FIG. 8 shows an alternative construction of the side walls of a sub-chamber.

FIG. 9 shows a top view of an alternative construction of a container.

FIG. 10 shows a top view of a further embodiment of a container.

SPECIFIC DESCRIPTION OF THE PREFERRED EMBODIMENTS

Figure 1:
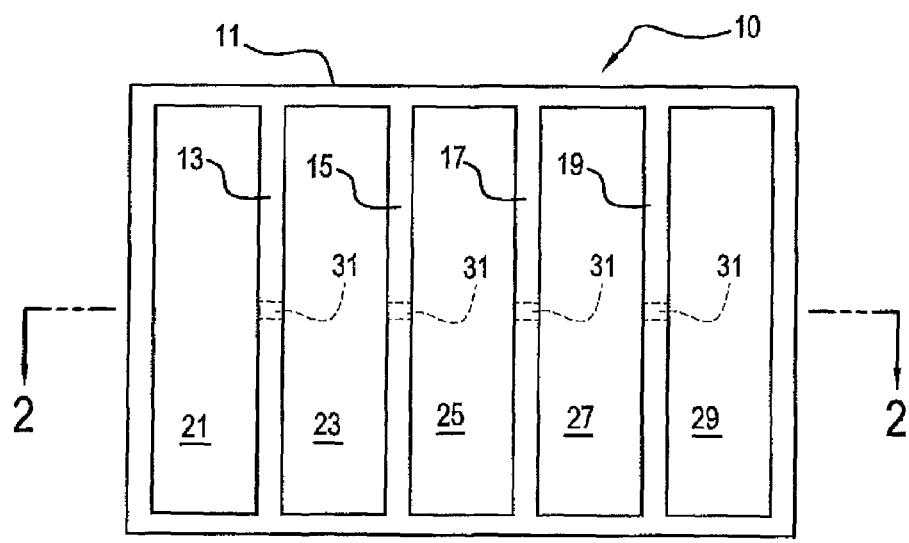
FIG. 1 shows a top view of a first embodiment of a container used to practice the present invention.
Figure 2:
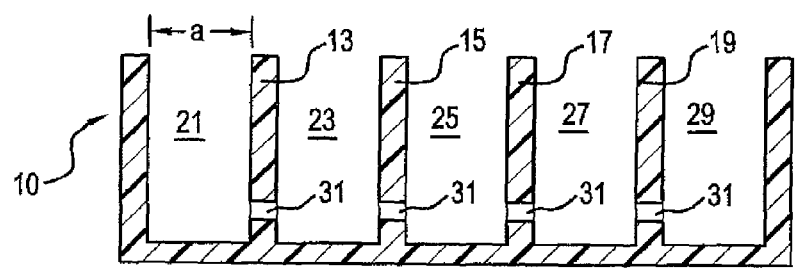
FIG. 2 shows a cross-sectional view along the line 2-2 of FIG. 1.

Reference is first made to FIGS. 1-6 for a description of the first embodiment of the present invention used to practice the inventive method which is generally designated by the reference numeral 10. As seen in FIG. 1, the device includes a peripheral wall 11 and internal walls 13, 15, 17 and 19 dividing the device 10 into five sub-chambers 21, 23, 25, 27 and 29. Adjacent sub-chambers are interconnected by respective weep holes 31 which serve to equalize the water level in all of the sub-chambers. Each of the sub-chambers preferably has a flat bottom that is slightly below the location of the weep holes 31 as best seen in FIG. 2.

Figure 3:
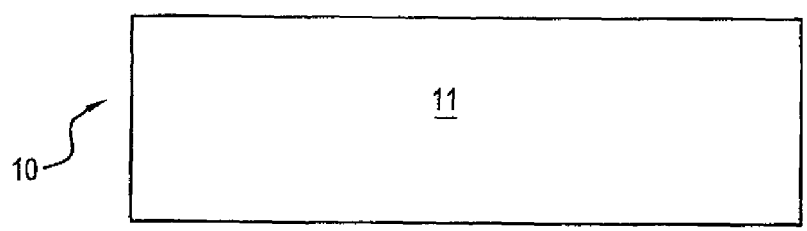
FIG. 3 shows a front view of the first embodiment of the present invention.
Figure 4:
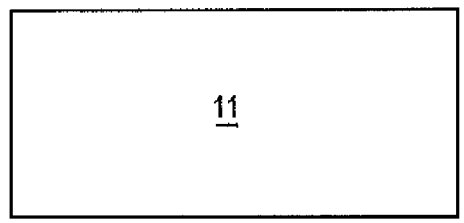
FIG. 4 shows a side view of the first embodiment of the present invention.
Figure 5:
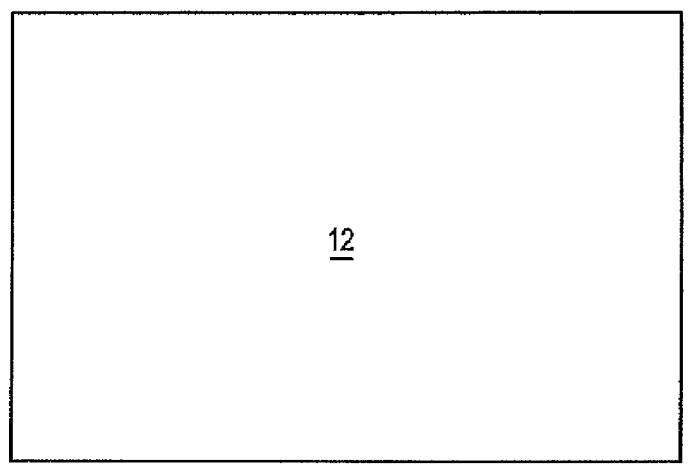
FIG. 5 shows a bottom view of the first embodiment of the present invention.
Figure 6:
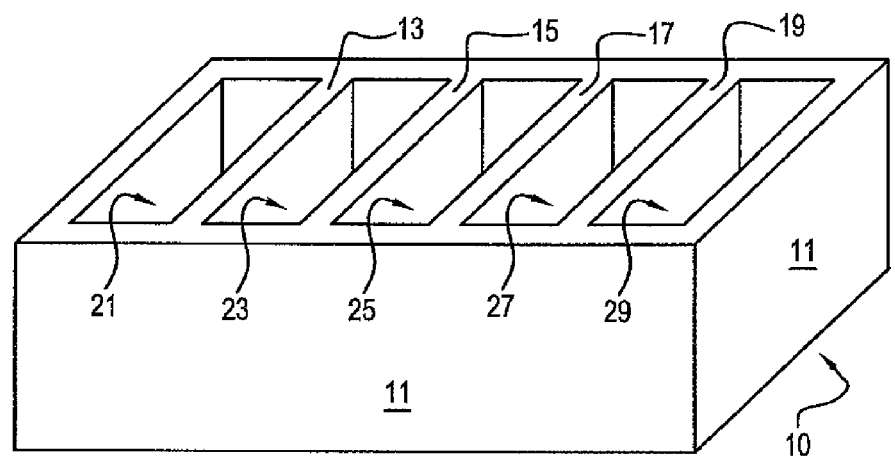
FIG. 6 shows a perspective view of the first embodiment of the present invention.

FIGS. 3 and 4 show portions of the peripheral wall 11 of the container 10, while FIG. 5 shows the bottom 12 of the container.

In the embodiment of FIGS. 1-6, water is filled into the chambers 21, 23, 25, 27 and 29. The level of water in these chambers or sub-chambers is equalized by virtue of the weep holes 31 best seen in FIG. 2. Thus, if an animal is drinking from the sub-chamber 21, water from the adjacent sub-chamber 23 replenishes the sub-chamber 21 via the weep hole 31 therebetween, while the other weep holes 31 further facilitate the water level equalization process.

FIG. 7 shows two of the walls 21 and 23 from the embodiment of FIGS. 1-6 shown having inner walls 22 and 24 spaced apart by a distance "a." An animal tongue 1 is schematically shown having a vertically descending portion 3 and a horizontal portion 5 that is curved with respect to the vertical portion 3 to facilitate lapping of water from a sub-chamber. The spacings between side edges of the portion 5 of the tongue 1 are designated by "b." The width of the portion 5 of the tongue 1 is shown by the reference letter "c."

In one example, the typical width of the tongue of a miniature dachshund is in the range of ¾ of an inch to 1 inch. This is the dimension "c" in FIG. 7. The smaller the dimension "b," the closer the side edges of the portion 5 of the tongue 1 will come to the inner walls 22, 24 when the animal is drinking. Thus, in the example of a miniature dachshund having a tongue with a width of 1 inch, making the dimension "a" 1 inch would mean that when the animal is drinking, the side edges of the portion 5 of the tongue are adjacent the surfaces 22 and 24, thereby enhancing efficiency of drinking. In that example, the dimension "b" would be zero.

In a further alternative, with reference to FIG. 8, the walls 21' and 23' may have upper terminations 26 and 28, respectively, that curve toward one another to enhance the efficiency of drinking by the tongue 1. The surfaces 30 and 32 as shown in FIG. 8 tend to cause a "funneling action" that maintains as much water as possible on the tongue 1 for as long a period of time as possible.

With reference to FIG. 9, a second embodiment used to practice the method of the present invention is designated by the reference numeral 40 and includes an outer peripheral wall 41 and one internal wall 43 defining with the peripheral wall 41 a first sub-chamber 45 and a second sub-chamber 47 interconnected by a weep hole 49. The sub-chamber 45 is partially defined by facing elongated walls 51 and 53 having a spacing "a" designed to closely approximate the width of the tongue of an animal that will be drinking from the sub-chamber 45. The sub-chamber 47 consists of a reservoir designed to replenish water into the sub-chamber 45 when an animal drinking therefrom reduces the water level. Of course, an animal may also drink from the sub-chamber 47, but without the efficiency that occurs when drinking from the sub-chamber 45. If desired, the sub-chamber 47 may include a cover precluding the animal from drinking therefrom. When the sub-chamber 47 is covered, at least one vent hole is provided in the cover (not shown) to facilitate equalization of levels in the sub-chambers 45 and 47 via the weep hole 49.

FIG. 10 shows a yet further embodiment generally designated by the reference numeral 60 and wherein three sub-chambers 61, 63 and 65 are provided with weep holes 67 and 69 equalizing water levels in the manner described above. In the container 60, the three sub-chambers have widths designed to facilitate drinking in an efficient manner by animals having tongues with widths of three distinct different dimensions. Otherwise, the device 60 is similar to the device 10 illustrated in FIGS. 1-6.

Figure 11:
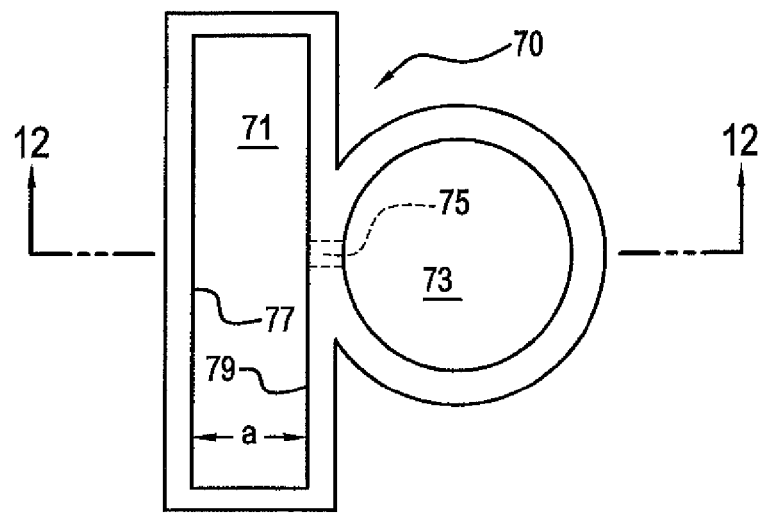
FIG. 11 shows a top view of a still further embodiment of a container.

A further embodiment is shown with reference to FIG. 11 and is designated by the reference numeral 70 and is seen to include a first sub-chamber 71 and a second sub-chamber 73 interconnected by a weep hole 75. The sub-chamber 71 includes inner walls 77 and 79 spaced from one another by a distance "a" designed to approximate the width of the tongue of an animal that will be drinking therefrom. As seen with reference to FIG. 12, the sub-chamber 73 is sized to receive an inverted bottle 81 having an inner chamber containing a quantity of water 83 and having an open mouth 85. As well understood, with this configuration, as an animal drinks from the sub-chamber 71, water is replenished to the sub-chamber 71 from the sub-chamber 73 via the weep hole 75. As water flows through the weep hole 75 from the sub-chamber 73, water is replenished to the sub-chamber 73 from the bottle 81. This configuration permits an animal to be fed over a significantly more lengthy period of time, for example, when its owner is away on travel.

In the embodiments of container used to practice the method of the present invention, it is preferred that the inventive containers be made of molded plastic. Of course, other materials may be used to construct the inventive device such as wood or a variety of metals.

Figure 12:
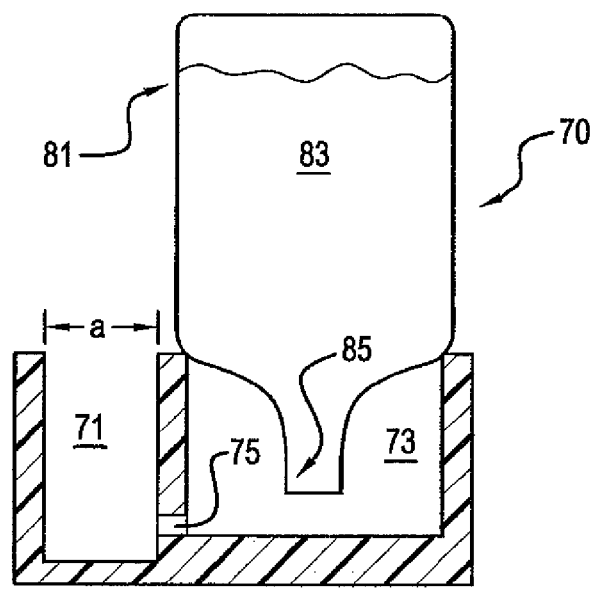
FIG. 12 shows a cross-sectional view along the line 12-12 of FIG. 11.

In the method of watering an animal using the embodiments of the present invention, any one of the embodiments of the invention is provided and is filled with water or other liquid and made available to one or more animal(s). As the animal drinks from each sub-chamber, water level is equalized from adjacent sub-chamber or sub-chambers. Water may be replenished to the sub-chambers by refilling or through an inverted bottle as shown in FIG. 12 or in any other desired manner.

In the embodiments set forth above, the weep holes interconnecting adjacent chambers have been described as being located in common walls. Alternatively, separate chambers or sub-chambers may be located in stand-alone housings with their weep holes interconnected by tubing or piping.

As such, an invention has been disclosed in terms of preferred embodiments thereof which fulfill each and every one of the objects of the invention set forth hereinabove, and provide a new and useful method of promoting efficient water drinking by animals of great novelty and utility.

Of course, various changes, modifications and alterations in the teachings of the present invention may be contemplated by those of ordinary skill in the art without departing from the intended spirit and scope thereof.

As such, it is intended that the present invention only be limited by the terms of the appended claims.

The invention claimed is:

1. A drinking container for animals, comprising:
a) a first narrow sub-chamber having spaced first and second side walls, said side walls having upper terminations that are linear and parallel throughout their lengths, and said first sub-chamber being filled with and retaining a quantity of liquid, said first sub-chamber also being defined by end walls shorter in length than said side walls, said end walls having upper terminations lying in a common horizontal plane with said upper terminations of said side walls, said end walls having respective ends connected to respective adjacent ends of said side walls;
b) a second sub-chamber being filled with and retaining a quantity of liquid and having one side at least partially defined by said second side wall, each sub-chamber having a floor, said sub-chambers being fluidly interconnected adjacent said sub-chamber floors;
c) said first and second side walls being spaced apart by a distance closely corresponding to a width of a tongue of an animal selected to drink said liquid from said container, whereby when said animal drinks said liquid with their tongue in a lapping motion, interaction between sides of said tongue and said walls results in a greater quantity of water remaining on said tongue for a longer period of time during each lap than would be the case (1) in the absence of said interaction and (2) if said distance did not closely correspond to said width of said tongue, thereby enhancing efficiency of drinking by said animal.

2. The container of claim 1, wherein said first and second sub-chambers are fluidly interconnected by at least one passageway through said second side wall.

3. The container of claim 1, wherein each of said sub-chambers has a set of parallel side walls defining each of said sub-chambers, each set of parallel walls being equally spaced apart.

4. The container of claim 3, including five sub-chambers, each defined by sets of equally spaced parallel side walls.

5. The container of claim 1, wherein said second sub-chamber comprises a reservoir for replenishing water drank from said first sub-chamber.

6. The container of claim 5, wherein said reservoir subtends a greater volume than said first sub-chamber.

7. The container of claim 5, wherein said reservoir is sized to receive an inverted bottle containing fluid for replenishing said reservoir and sub-chamber.

8. The container of claim 1, wherein said liquid comprises water.

9. The container of claim 1, wherein said upper terminations are spaced apart by said distance.

10. The container of claim 9, wherein said upper terminations taper toward one another.

11. The container of claim 3, further including third, fourth and fifth sub-chambers, all five sub-chambers having a set of parallel walls, each set of parallel walls being equally spaced apart.

12. The container of claim 1, further including a third sub-chamber, each of said sub-chambers defined by a set of parallel walls, said sets of walls being spaced apart by respective differing spacings corresponding to differing widths of tongues of different animals.

13. The container of claim 1, wherein said distance is 1 inch.

14. The container of claim 1, made of molded plastic.

15. A drinking container for animals, comprising:
a) a first narrow sub-chamber having side walls parallel throughout their lengths and being filled with and retaining a quantity of liquid, said side walls having respective ends, adjacent ones of said respective ends of said side walls being connected to respective ends of end walls located at each end of said side walls;
b) said walls being spaced apart by a distance closely corresponding to a width of a tongue of an animal selected to drink said liquid from said container, whereby when said animal drinks said liquid with their tongue in a lapping motion, interaction between sides of said tongue and said walls results in a greater quantity of water remaining on said tongue for a longer period of time during each lap than would be the case (1) in the absence of said interaction and (2) if said distance did not closely correspond to said width of said tongue, thereby enhancing efficiency of drinking by said animal;
c) a second sub-chamber, said sub-chambers having a common wall and being fluidly interconnected;
d) said second sub-chamber comprising a reservoir for replenishing water drank from said first sub-chamber.

16. The container of claim 15, wherein said reservoir subtends a greater volume than said first sub-chamber.

17. The container of claim 15, wherein said reservoir is sized to receive an inverted bottle filled with fluid for replenishing said reservoir and sub-chamber.

18. The container of claim 15, wherein said liquid comprises water.

19. The container of claim 15, made of molded plastic.

20. The container of claim 15, wherein said sub-chambers are fluidly interconnected via a small weep hole through said common wall.

* * * * *